(12) United States Patent
Pucciani

(10) Patent No.: US 8,707,989 B2
(45) Date of Patent: Apr. 29, 2014

(54) MOUNTING SYSTEM FOR FLUID DISCHARGE DEVICES

(75) Inventor: Allen S. Pucciani, Beavercreek, OH (US)

(73) Assignee: Illinois Tool Works Inc., Glenview, IL (US)

( * ) Notice: Subject to any disclaimer, the term of this patent is extended or adjusted under 35 U.S.C. 154(b) by 679 days.

(21) Appl. No.: 12/875,078

(22) Filed: Sep. 2, 2010

(65) Prior Publication Data

US 2011/0048557 A1 Mar. 3, 2011

Related U.S. Application Data

(60) Provisional application No. 61/239,783, filed on Sep. 3, 2009.

(51) Int. Cl.
*F16L 39/00* (2006.01)

(52) U.S. Cl.
USPC ...... 137/561 A; 454/305; 454/154; 285/136.1

(58) Field of Classification Search
USPC ....... 137/561 A; 454/305, 263, 154; 239/450, 239/556, 566, 567, 587.2, 587.4, 587.6, 239/550, 587.1, 587.5; 141/236–245; 285/136.1, 142.1, 405, 414, 363, 368, 285/140.1, 213, 278, 280, 272

See application file for complete search history.

(56) References Cited

U.S. PATENT DOCUMENTS

| | | | | |
|---|---|---|---|---|
| 1,163,277 A | * | 12/1915 | Staggers | 285/343 |
| 1,976,797 A | * | 10/1934 | Naylor | 285/373 |
| 2,374,574 A | * | 4/1945 | Adams, Jr. | 285/412 |
| 2,514,504 A | * | 7/1950 | Moline | 285/140.1 |
| 3,076,668 A | * | 2/1963 | Famely | 285/137.11 |
| 4,270,702 A | * | 6/1981 | Nicholson | 239/455 |
| 4,515,313 A | * | 5/1985 | Cavanagh | 239/455 |
| 4,930,705 A | * | 6/1990 | Broerman | 239/590.5 |
| 5,029,879 A | * | 7/1991 | Strang, Sr. et al. | 277/606 |
| 5,657,928 A | * | 8/1997 | Jian | 239/242 |
| 5,680,993 A | * | 10/1997 | McCracken et al. | 239/433 |
| 5,725,008 A | * | 3/1998 | Johnson | 137/15.17 |
| 6,000,420 A | * | 12/1999 | Nicholson et al. | 137/15.01 |
| 6,065,693 A | * | 5/2000 | Lukas | 239/548 |
| 6,113,047 A | * | 9/2000 | Wung et al. | 248/284.1 |
| 7,204,733 B2 | * | 4/2007 | Nash et al. | 440/88 A |
| 2005/0199293 A1 | * | 9/2005 | Fulcher et al. | 137/561 A |
| 2007/0277548 A1 | * | 12/2007 | Stefani | 62/407 |
| 2008/0245903 A1 | * | 10/2008 | Loth | 239/548 |
| 2010/0120350 A1 | * | 5/2010 | Pucciani | 454/188 |

* cited by examiner

*Primary Examiner* — John Rivell
*Assistant Examiner* — David Colon Morales
(74) *Attorney, Agent, or Firm* — Fletcher Yoder P.C.

(57) ABSTRACT

A fluid discharge device having a main body with first and second ends may be mounted to one or more components of a system. The first end may include an inlet for receiving a fluid flow. A mounting system may include a first mounting plate having an opening with a diameter that is greater than the inlet diameter. An insert may include an outside wall configured to be fitted to the opening of the first mounting plate and may include an inside wall that defines another opening through which the inlet of the fluid discharge device may be fitted. The opening defined by the inside wall of the insert may provide a radial clearance for the inlet that compensates for distortions and/or deviations from an expected inlet and/or main body shape, wherein such distortions may be caused at least partially by stresses experienced during manufacturing.

20 Claims, 8 Drawing Sheets

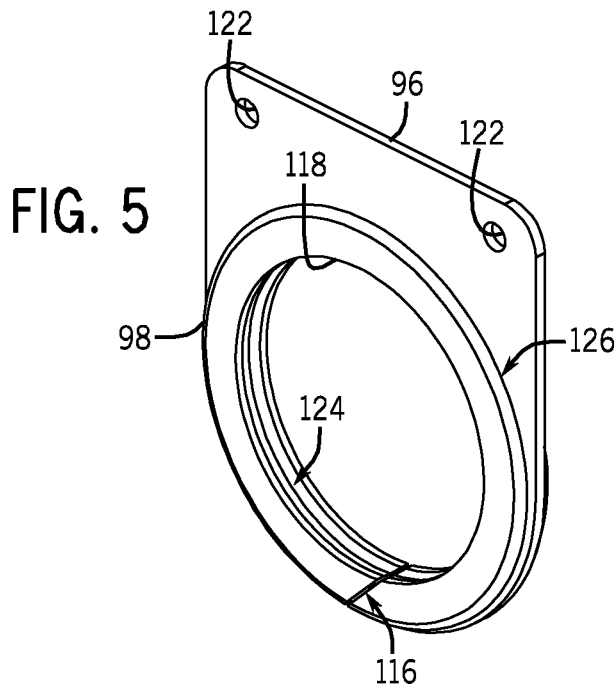
FIG. 5
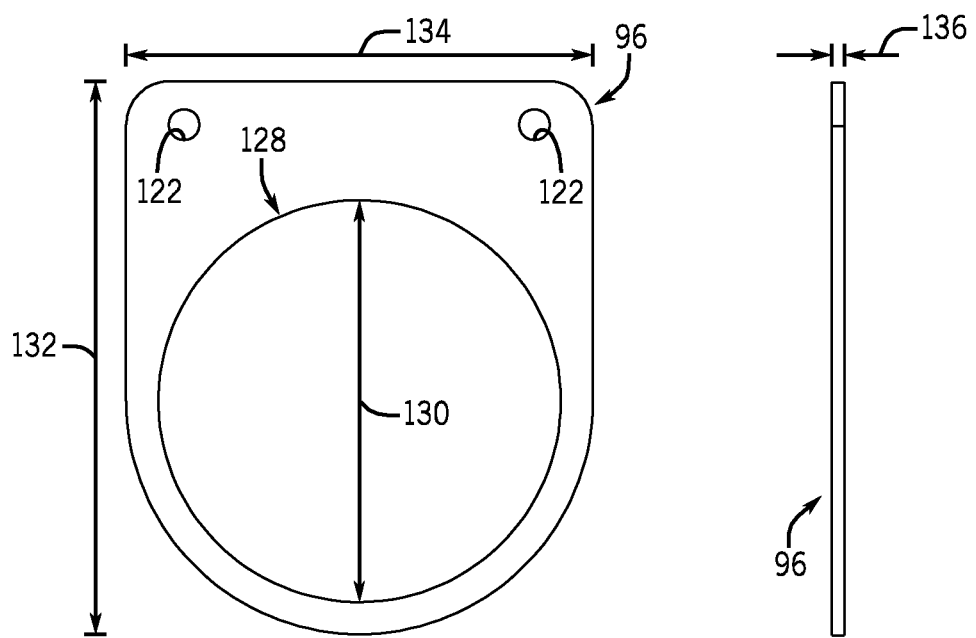
FIG. 6
FIG. 7

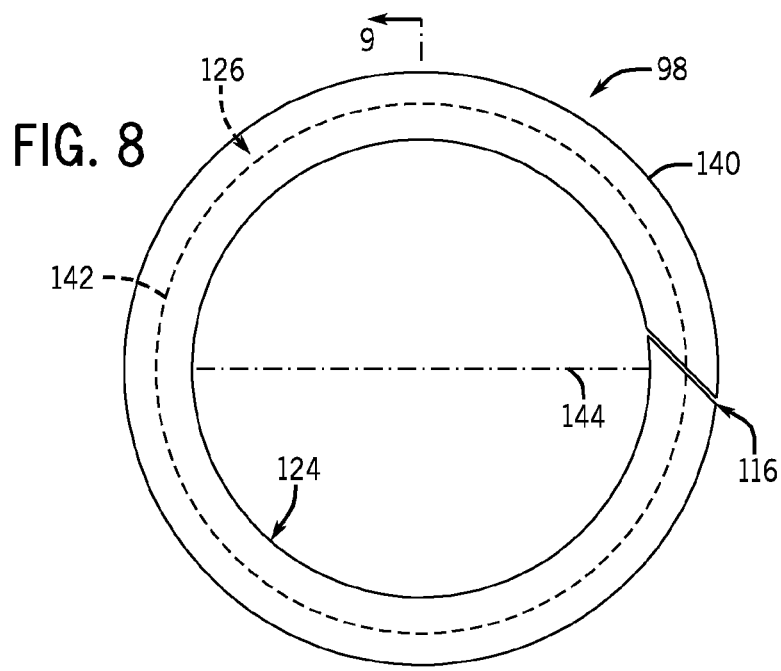
FIG. 8
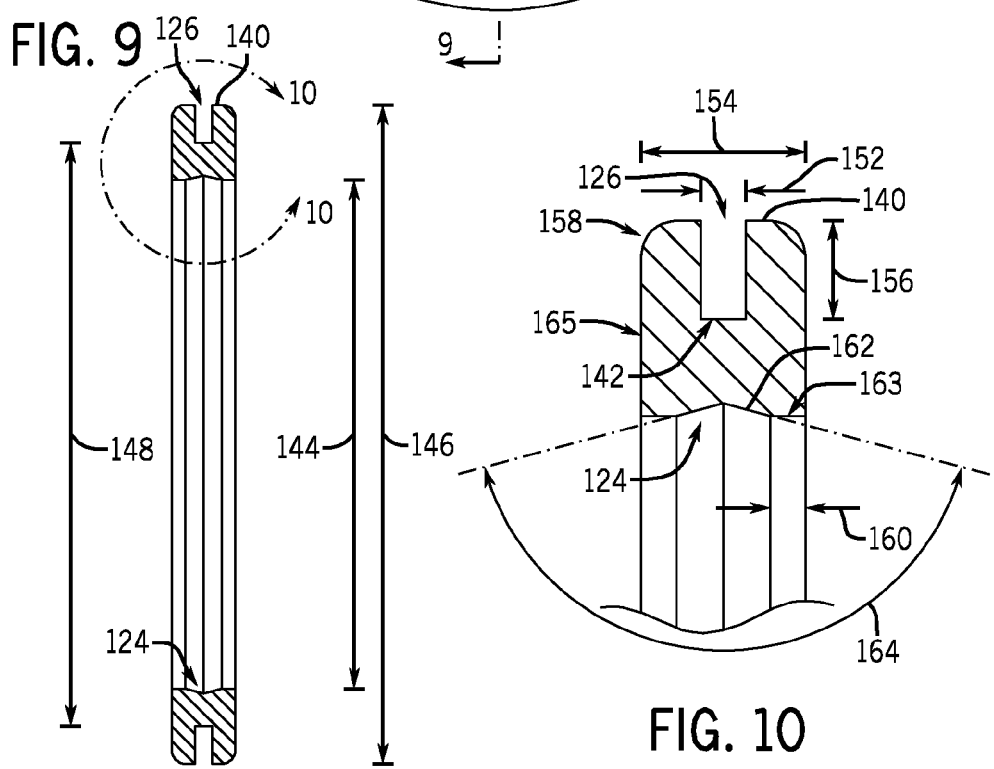
FIG. 9
FIG. 10

MOUNTING SYSTEM FOR FLUID DISCHARGE DEVICES

CROSS REFERENCE TO RELATED APPLICATIONS

This application is a Non-Provisional patent application of U.S. Provisional Patent Application No. 61/239,783, entitled "AIR KNIFE", filed Sep. 3, 2009, which is herein incorporated by reference in its entirety.

BACKGROUND

The invention relates generally to fluid discharge devices and, more particularly, to a system and method for mounting such fluid discharge devices one or more components of a processing system.

A variety of systems transfer fluids from a fluid supply source to one or more fluid discharge devices. In some systems, an arrangement of fluid conduits, which may include metal pipes, plastic pipes, and/or hoses, may provide a flow path for routing, channeling, or otherwise delivering a fluid from a fluid supply source to a fluid discharge device, such as an air manifold. In the case of an air manifold, air received via an inlet may be pressurized and directed through a series of nozzles. Fluid discharge devices may also include an air knife, through which air received via an inlet may be pressurized and directed through a slot-shaped outlet as a sheet or "blade" of air. The output of the fluid discharge devices may be utilized for a variety of applications, such as drying and removing moisture from objects, removing dust or debris, cooling, surface preparation, and so forth.

BRIEF DESCRIPTION

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

Embodiments of a fluid discharge system may include a fluid discharge device having a main body with first and second ends. The first end of the main body may include an inlet for receiving a flow of a fluid (e.g., air), and the second end of the main body may be sealed. The fluid discharge device may be mounted to one or more components of the fluid discharge system using at least a first mounting plate that has an opening with a diameter that is greater than the inlet diameter. An insert, which may be fabricated using a plastic, thermoplastic, or polymer material, may include an outside wall configured to be fitted to the opening of the first mounting plate and may include an inside wall that defines another opening through which the inlet of the fluid discharge device may be fitted. The opening defined by the inside wall of the insert may provide a radial clearance for the inlet that compensates for distortions and/or deviations from an expected inlet and/or main body shape, wherein such distortions may be caused at least partially by stresses experienced by the main body during manufacturing.

DRAWINGS

These and other features, aspects, and advantages of the present invention will become better understood when the following detailed description is read with reference to the accompanying drawings in which like characters represent like parts throughout the drawings, wherein:

FIG. 5 is a perspective view showing an embodiment of an inlet-side mounting plate and an insert in a fitted arrangement, but removed from the air manifold shown in FIGS. 2-4;

FIG. 6 is a front view of the inlet-side mounting plate of FIG. 5, but with the insert removed;

FIG. 7 is a side view of the inlet-side mounting plate of FIG. 5, but with the insert removed;

FIG. 8 is a front view of the insert of FIG. 5, but removed from the inlet-side mounting plate;

FIG. 9 is a cross-sectional side view of the insert taken along cut-line 9-9 of FIG. 8;

FIG. 10 is more detailed view of a portion of the insert taken about arcuate line 10-10 of FIG. 9;

DETAILED DESCRIPTION

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

Figure 1:
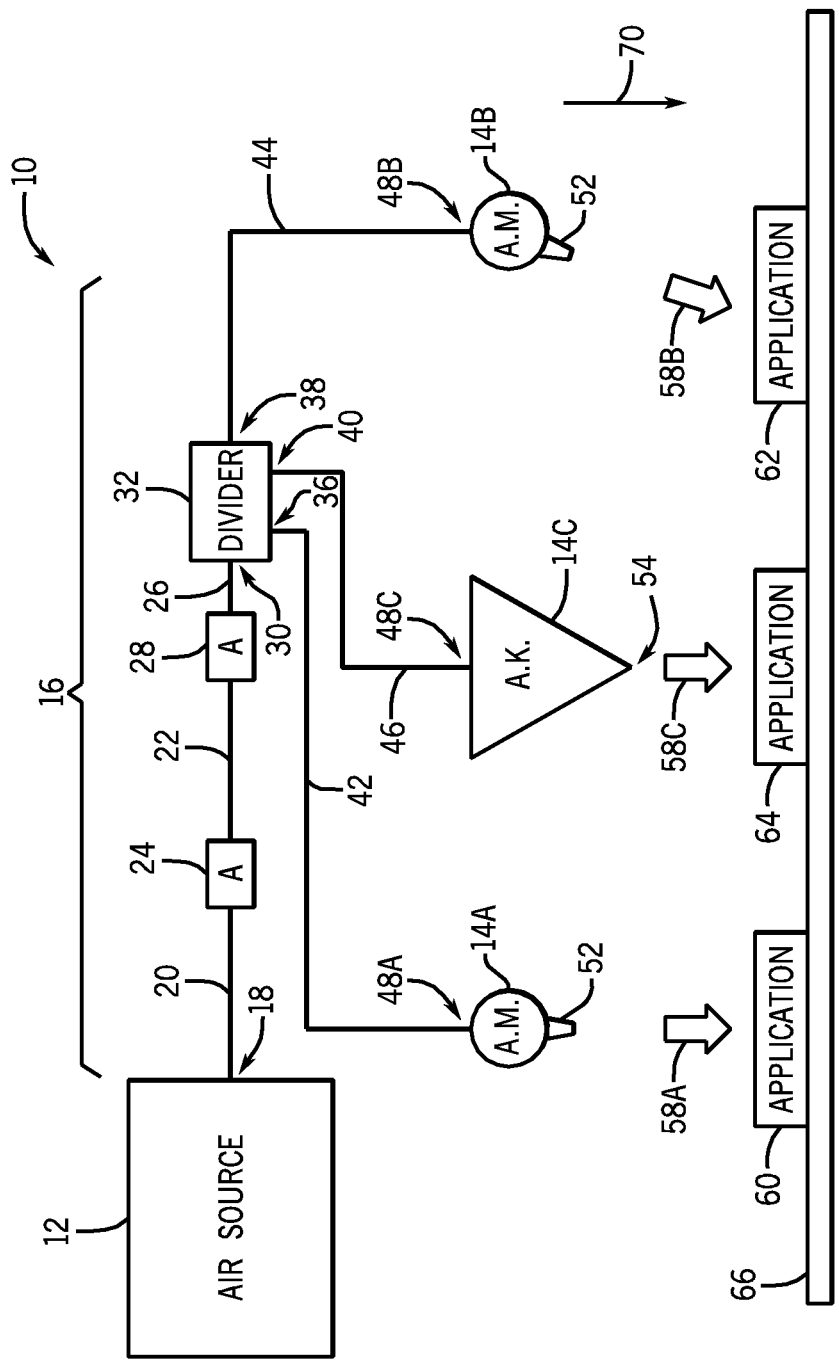
FIG. 1 is a simplified block diagram depicting a fluid-based system having one or more fluid discharge devices, in accordance with embodiments of the present disclosure.

Turning to the drawings, FIG. 1 illustrates a processing system 10 that may incorporate one or more aspects of the presently disclosed techniques. The processing system 10 includes an air supply source 12 that may deliver a fluid (e.g., air) to fluid discharge devices 14A, 14B, and 14C along a flow path 16. In the illustrated embodiment, the fluid discharge devices 14A and 14B may include air manifolds each having an arrangement of nozzles, and the fluid discharge device 14C may include an air knife having a discharge slot. In the illustrated embodiment, the flow path 16 includes the fluid conduits 20, 22, 26, 42, 44, 46, the adapters 24 and 28, and the divider 32.

In the presently illustrated system 10, the air supply source 12 may include a high flow centrifugal blower ("air blower") which, in some embodiments, may include a supercharger and motor configuration. In one embodiment, the operating characteristics of the air blower 12 may provide an air flow having a pressure of between approximately 1-10 pounds per square inch (psi) and having a flow rate of between approximately 50-2000 cubic feet per minute (CFM) or more specifically, between approximately 150 to 1500 CFM. In some embodiments, the air blower 12 may be housed within an enclosure. The air blower 12 may be separated from the air fluid discharge device 14A, 14B, and 14C by a distance of 10, 20, 30, 40, 50, 100, or 200 feet or more. As such, the flow path 16 is configured to provide a path through which air provided by the air blower 12 may be routed and ultimately delivered to the fluid discharge devices (e.g., air manifolds 14A and 14B and air knife 14C).

The air blower 12 may include an outlet 18 coupled to the fluid conduit 20 that defines a first portion of the flow path 16. The fluid conduit 20 may be coupled to the downstream fluid conduit 22 by way of a first adapter 24. By way of example only, the fluid conduit 20 may be a hose, such as a flexible hose, and the fluid conduit 22 may be a pipe, such as a stainless steel pipe or a polyvinyl chloride (PVC) pipe. The adapter 24 may be configured to provide an interface for coupling the hose 20 and pipe 22. For instance, the adapter 24 may include a first adapter end configured to couple to the hose 18, and a second adapter end configured to couple to the pipe 20. In this manner, the hose 20, adapter 24, and pipe 22 are fluidly coupled, thereby allowing air discharged from the outlet 18 of the blower 12 to flow from the hose 20 into the pipe 22.

The flow path 16 continues to the distal end of the pipe 22, which may be coupled to another hose 26 by way of a second adapter 28 that may be similar in design to the first adapter 24. By way of example only, the adapters 24 and 28 may be of a type disclosed in U.S. patent application Ser. No. 12/613,493, entitled "Adapter" and filed on Nov. 5, 2009 by the present inventor, the entirety of which is incorporated by reference. Thus, by way of the adapters 24 and 28, the air flow from the blower 12 may be received by an inlet 30 of a flow divider 32. The flow divider 32 may be configured to distribute or split the air flow to multiple outlets 36, 38, and 40. Additional fluid conduits 42, 44, and 46 may respectively couple the outlets 36, 38, and 40 the fluid discharge devices 14A, 14B, and 14C, respectively. In the illustrated embodiment, the fluid discharge devices 14A, 14B, and 14C may each include an inlet (48A, 48B, and 48C) configured for a hose connection, and the fluid conduits 42, 44, and 46 may thus be provided as hoses, such as flexible hoses. In other embodiments, a pipe may be disposed between the divider 32 and one of the fluid discharge devices (e.g., air manifolds 14A or 14B or air knife 14C), whereby adapters similar to the above-discussed adapters 24 or 28 are coupled to each end of the pipe to facilitate a fluid connection between hoses extending from an outlet (e.g., 36, 38 or 40) of the divider 32 and from an inlet (e.g., 48A, 48B, or 48C) of one of the fluid discharge devices 14A, 14B, or 14C. Further, although multiple fluid discharge devices are illustrated in the system 10 of FIG. 1, it should be understood that in some embodiments, the system 10 may include only a single fluid discharge device and thus may not include a divider 32. In such embodiments, the fluid conduit 26 may be coupled directly to an inlet of the fluid discharge device.

The air manifolds 14A and 14B may include a main body or housing that defines a plenum or fluid cavity for receiving an air flow via the respective inlets 48A and 48B. In certain embodiments, the air manifolds 14A or 14B may be formed of materials including aluminum, stainless steel, plastic or composite materials, or some combination thereof. In some embodiments, the main body may be generally cylindrical in shape and may include one or more openings which provide a path for air to flow into respective nozzles 52 coupled to the main body of the air manifold. By way of example only, the air manifolds 14A and 14B may be of a type disclosed in U.S. patent application Ser. No. 12/650,373, entitled "Air Manifold Having Nozzles" and filed on Dec. 30, 2009 by the present inventor, the entirety of which is incorporated by reference.

The air knife 14C may include a main body defining a plenum or fluid cavity for receiving an air flow via the inlet 48C. In certain embodiments, the air knife 14C may be formed of materials including aluminum, stainless steel, or some combination thereof. In some embodiments, the main body may be generally cylindrical in shape with one end along the cylindrical body tapering to form a narrow discharge outlet 54, which may include a single continuous slot or, in other embodiments, a series of narrow holes or openings. In embodiments utilizing such a design, the main body of the air knife 14C may generally take the form of a tear drop shape. By way of example only, the air knife 14C may be of a type disclosed in U.S. patent application Ser. No. 12/614,359, entitled "Air Knife" and filed on Nov. 6, 2009, or in U.S. patent application Ser. No. 12/789,411, entitled "Air Knife" and filed on May 27, 2010, both of which are by the present inventor and are incorporated by reference in their entireties.

In operation, the fluid cavity defined by the main body of the air manifolds 14A and 14B may pressurize and discharge air received via their inlet 48A and 48B through the nozzle(s) 52, as indicated by their respective output air flows 58A and 58B. Similarly, the fluid cavity defined by the main body of the air knife 14C may pressurize and discharge air received via the inlet 48C through the discharge slot 54, as indicated by air flow 58C. Accordingly, the air flow exiting the nozzle(s) 52 and the discharge slot 54 may have a velocity that is greater than the velocity of the air flow entering via the inlets 48A, 48B, and 48C. Further, while only three outlets 36, 38, and 40 are shown in FIG. 1, it should be appreciated that the flow divider 32 may be configured to provide any suitable number of outlets, and may provide flow paths to any suitable number of devices, such as additional air manifolds, air knives, flow dividers, and so forth.

As shown in FIG. 1, the air flows 58A, 58B, and 58C exiting the respective nozzles 52 of each of the air manifolds 14A and 14B and the discharge slot 54 of the air knife 14C may be directed towards the applications 60, 62, and 64, respectively, of the processing system 10. For instance, the applications 60, 62, and 64 may be transported through the system 10 along a conveyor belt 66 or some other suitable type of transport mechanism. As will be appreciated, the application represented by the system 10 may utilize the output air flows 58 provided by fluid discharge devices 14A-14C for a variety of functions, including but not limited to drying products, removing dust or debris, coating control, cooling, leak detection, surface impregnation, corrosion prevention, and so forth. For instance, in certain embodiments, the system 10 may be a system for drying food or beverage containers, such as cans or bottles, or may be a system for removing dust and other debris from sensitive electronic products, such as printed circuit boards (PCBs) or the like. In addition, some embodiments of the system 10 may also utilize the air flows 58 to clean and/or remove debris from the conveyer belt 66.

In accordance with aspects of the present disclosure, the fluid discharge devices 14 may each include an adjustable mounting system that enables a user to position each device 14 so as to direct the exiting air flows 58 in a desired direction. For instance, in FIG. 1, the air manifold 14A and the air knife 14C are each mounted within the system 10 and oriented such that their exiting air flows 58A and 58C are directed in the downward vertical direction 70. By comparison, the air manifold 14B is mounted within the system 10, such that the exiting air flow 58B is directed towards the application 62 at an angle that is offset with respect to the vertical direction 70. As discussed below, the disclosed embodiments of the mounting system may provide angular positions ranging over a span of at least approximately 90, 180, 270, or 360 degrees, or an angular range between 0 and 360 degrees. While the discussion pertaining to the embodiments of the mounting system below focuses on the use of a mounting system with an air manifold, it should be understood that the mounting system may also be applied to air knives and other fluid discharge devices.

Figure 2:
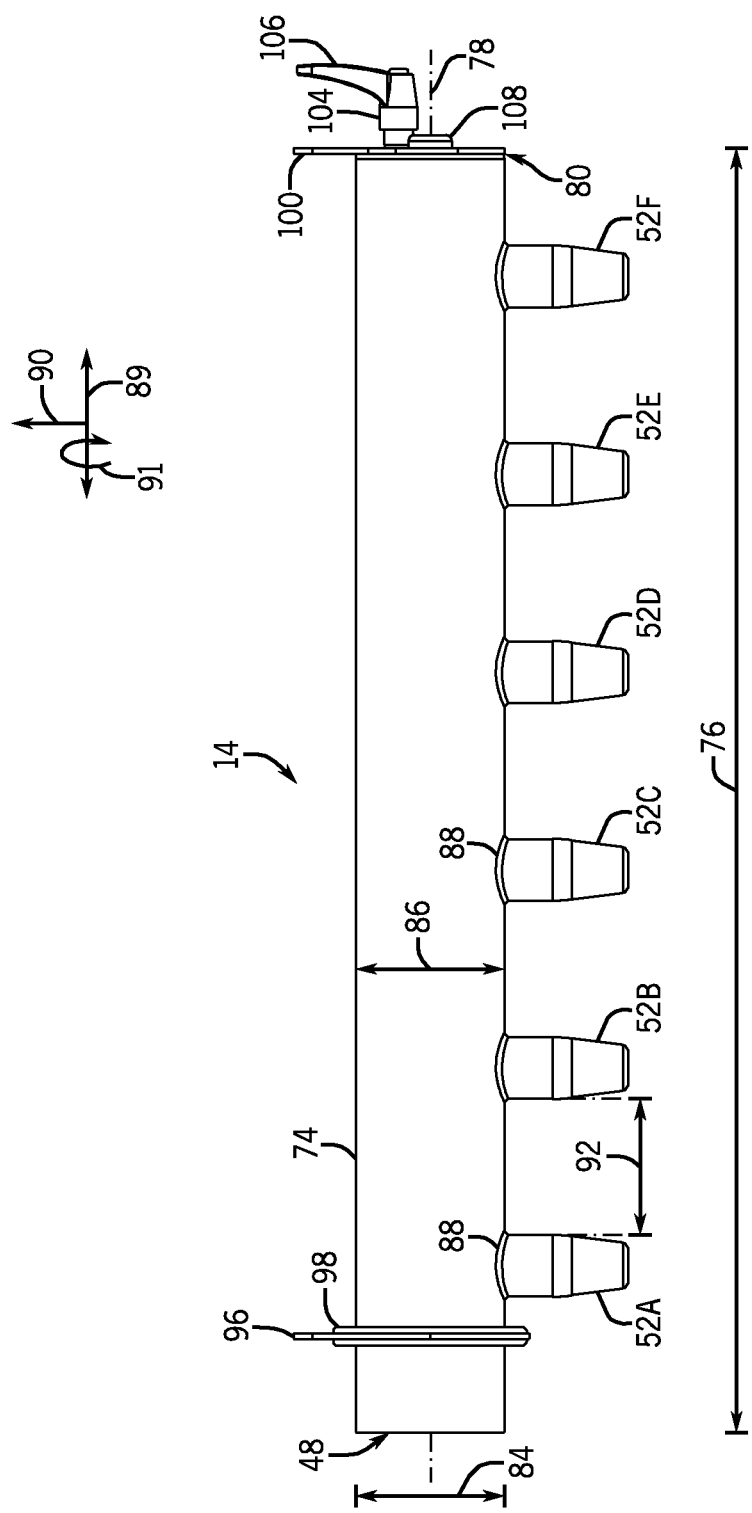
FIG. 2 is a side view of an embodiment of an air manifold that includes a mounting system configured to mount the air manifold to one or more components of the fluid-based system of FIG. 1.
Figure 3:
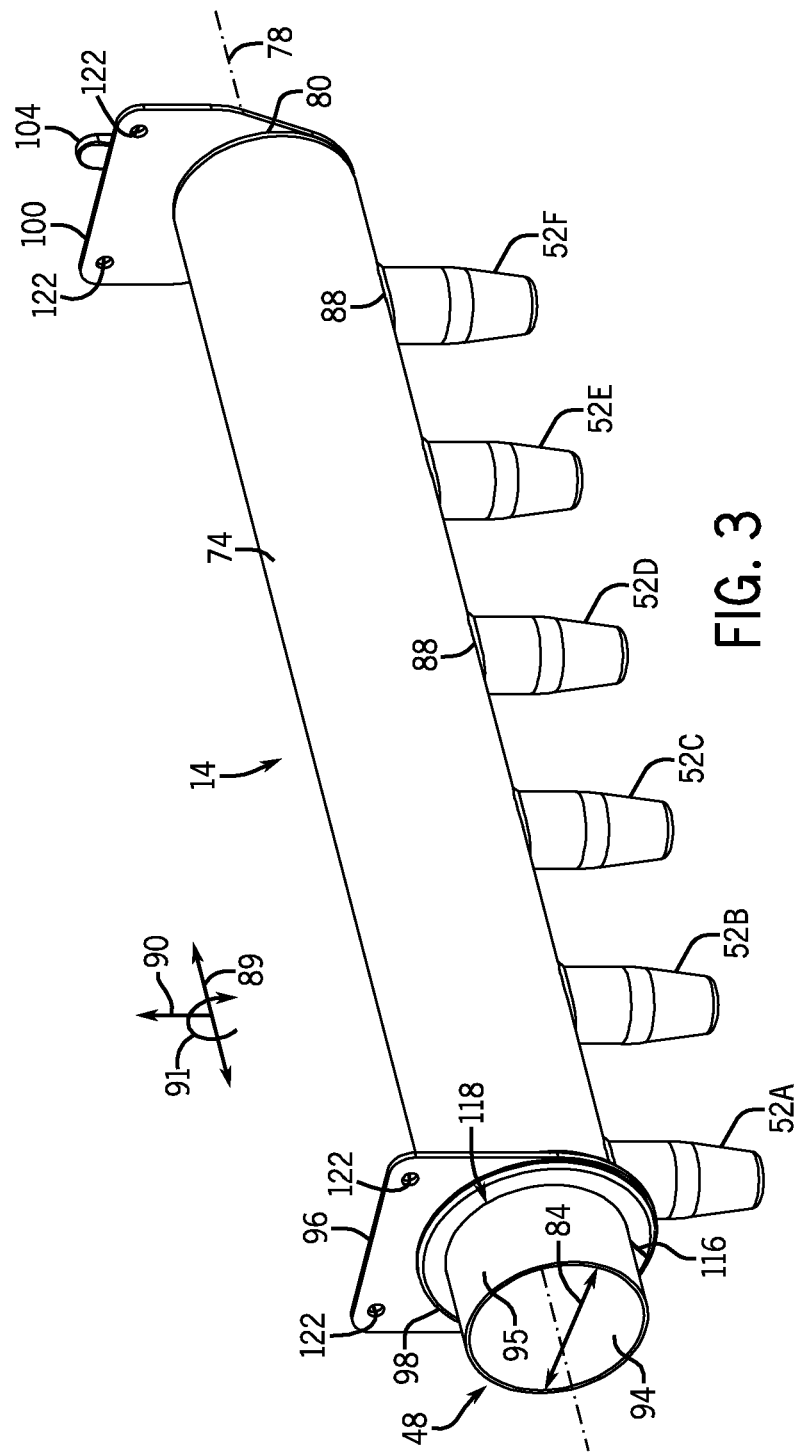
FIGS. 3 and 4 are perspective views of the embodiment of the air manifold and the mounting system shown in FIG. 2.
Figure 4:
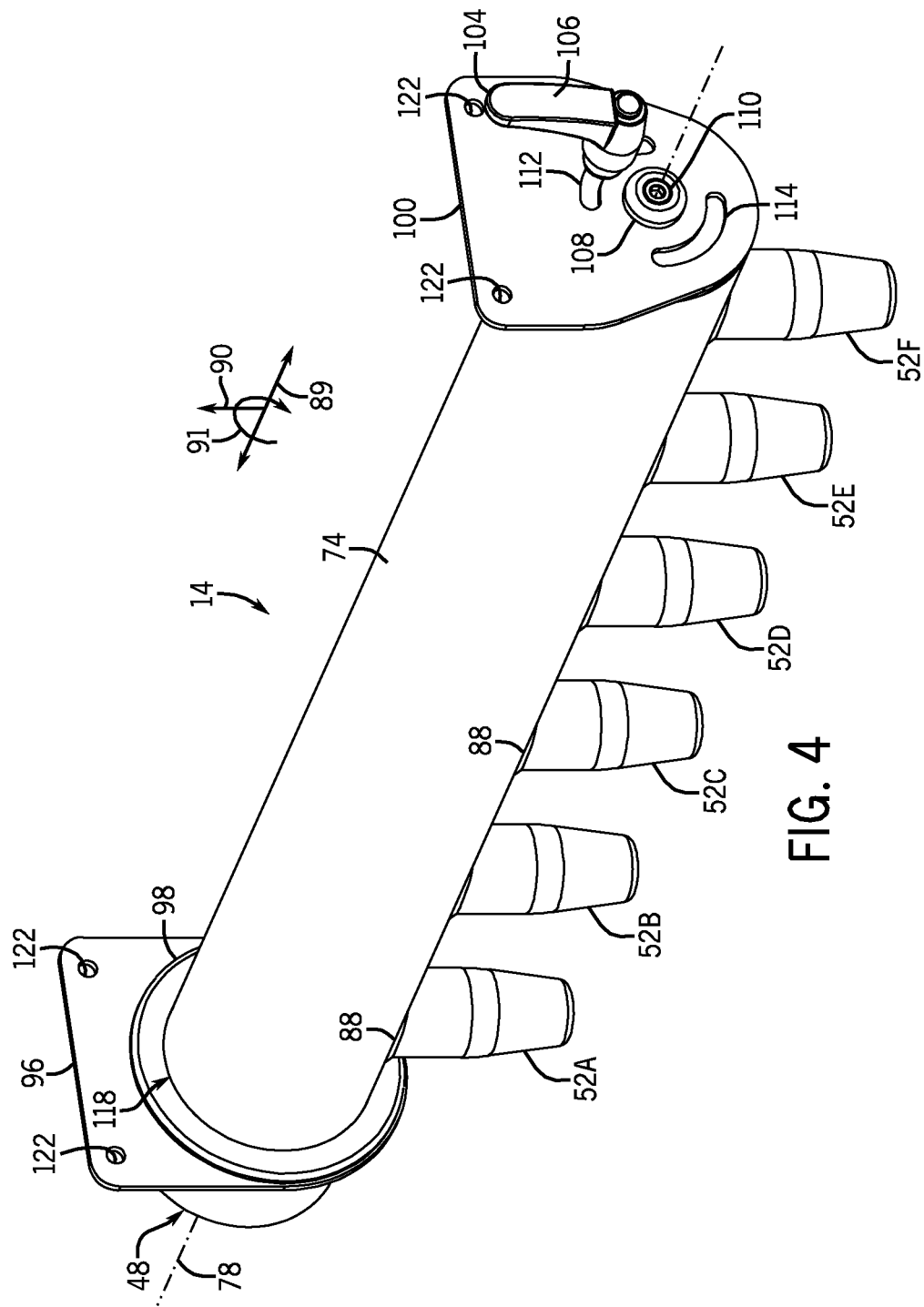

Referring now to FIGS. 2-4, side and perspective views showing an embodiment of an air manifold that may be utilized in the system 10 of FIG. 1 are illustrated. In order to facilitate a better understanding of the present disclosure, FIGS. 2-4 will generally be described together. Specifically, FIG. 2 shows a side view of the air manifold 14, FIG. 3 shows a perspective view of the air manifold 14 from an inlet end, and FIG. 4 shows a perspective view of the air manifold 14 from an adjustment end, opposite the inlet end.

As illustrated, the air manifold 14 includes a main body or housing 74 which may have an axial length 76 (e.g., measured along the longitudinal axis 78). By way of example only, the length 76 of the main body 56 may be between approximately 0.5 feet to 4 feet (e.g., 0.5, 1, 1.5, 2, 2.5, 3, 3.5, or 4 feet). In other embodiments, the length 76 may also be greater than 4 feet (e.g., 5, 6, 7, or 8 feet).

The main body 74 in the depicted embodiment is generally cylindrical in shape (e.g., having a generally circular cross section). In other embodiments, the main body 74 may also have a non-circular shape, such as an oval-shaped cross-section, a diamond-shaped cross-section, a triangular-shaped cross section, a square or rectangular-shaped cross-section, and so forth. A first end of the main body 74 is open and forms the inlet 48. As mentioned above, air supplied by the air source 12 may be routed to the air manifold 14 through the inlet 48 and discharged via the nozzles 52A-52F. For instance, the inlet 48 may be coupled to a fluid conduit (e.g., conduit 36). A second end (a sealed end) of the main body 74 that is opposite the inlet end may be sealed by an end cap 80. In certain embodiments, the end cap 80 may have a shape that is generally the same as the cross-sectional shape of the main body 74 (e.g., circular). The end cap 80 may be joined to the main body 80 by welding (e.g., tungsten inert gas (TIG) welding), or fastened to the main body 80 using one or more screws, bolts, or any other suitable type of fastener.

The inlet 48 and the main body 74 are depicted in FIG. 2 as having diameters 84 and 86, respectively. In certain embodiments, the diameters 84 and 86 may be equal. By way of example only, in one embodiment, the diameters 84 and 86 may be between approximately 1 to 6 inches (e.g., 2, 2.5, 3, 3.5, 4, 4.5, 5, 5.5, or 6 inches). In other embodiments, the diameters 84 and 86 may be different sizes. Further, in some embodiments, the diameter 86 may vary along the length 76 of the main body 74. For instance, the diameter may 86 progressively decrease or increase from the inlet end to the sealed end (e.g., having end cap 80).

As shown, the air manifold 14 includes the nozzles 52A-52F extending radially (e.g., radial direction 90) outwards from the main body 74. For instance, the main body 74 may include a number of openings, each of which corresponds to a respective one of the nozzles 52A-52F. The inlet ends of the nozzles 52A-52F may be welded to the main body 74 via TIG welding, as mentioned above, or via any other suitable type of welding technique, as shown by the weld joints 88. In particular, the inlet ends of the nozzles 52A-52F may be welded to the openings on the main body 74, such that air flowing into the main body 74 of the air manifold 14 via the inlet 48 may flow through an opening of the main body 74 and into a respective one of the nozzles 52A-52F. That is, each nozzle 52A-52F and its respective opening on the main body 74 may define a flow path by which air entering the main body 74 may be discharged from the air manifold 14.

While the depicted embodiment of FIG. 2 shows six nozzles (52A-52F), it should be appreciated that various embodiments may provide any suitable number of nozzles. For instance, certain embodiments may include 2 to 20 nozzles or more. The nozzles 52A-52F may be axially spaced (e.g., in axial direction 89) apart along the length 76 of the main body 74 such that each nozzle 52A-52F is separated in the axial direction (e.g., along axis 78) by the distance 92. The distance 92, in some embodiments may be between approximately 1 to 12 inches (e.g., 1, 1.5, 2, 2.5, 3, 3.5, 4, 4.5, 5, 5.5, 6, 7, 8, 9, 10, 11, or 12 inches). In other embodiments, the distance 92 may be determined as a percentage of the total axial length 76 of the body 74. For instance, in certain embodiments, the distance 92 may be between approximately 10 to 30 percent or, more specifically, between approximately 15 to 25 percent of the length 76 of the main body 74. In further embodiments, the spacing 92 may be different between each nozzle 52A-52F. For instance, in one embodiment, the spacing 92 may progressively increase or decrease from the inlet end to the sealed end of the air manifold 14.

As shown in FIGS. 2-4, the inlet 48 includes an annular inner wall 94 and an annular outer wall 95. The inlet diameter 84 may be measured through the outer wall 95 of the inlet 48 (e.g., includes the distance between the outer wall 95 and the inner wall 94). The air manifold 14 may include an adjustable mounting system that includes a first mounting plate 96 (an "inlet-side" mounting plate) with an insert 98 that is configured to be fitted against the outer wall 95 of the inlet 48, and a second mounting plate 100 (an "adjustment-side" mounting plate) coupled to the sealed end of the air manifold 14. In addition to the adjustment-side mounting plate 100, the adjustment end of the air manifold 14 also includes a tool-free fastener 104 with a handle 106 (e.g., a lever), a separator element 108 (e.g., a spacer or standoff), and a fastener 110 (e.g., a screw). The adjustment-side mounting plate 100 may include arcuate grooves or slots 112 and 114 that are radially offset (e.g., radial direction 90) from the fastener 110. The end cap 80 of the air manifold 14 may include an opening, such as a threaded hole, for receiving mating threads of the fastener 110. As will be discussed in further detail below, the separator element 108 and the fastener 110 may provide axial retention (e.g., in direction 89) of the air manifold 14, but still permit a degree of rotational movement (e.g., in the rotational direction 91) suitable for pivoting the main body 74 about the rotational axis 78 to adjust the rotational position of the air manifold 14. That is, the separator element 108 and the fastener 110 provide only one degree of freedom (e.g., rotational movement of the main body 64 relative to the adjustment-side mounting plate 100). In this manner, the direction of the exiting air flow 58 from the nozzles 52 may be adjusted.

Once the air manifold 14 has been oriented to a desired position, retention in the rotational direction (e.g., direction 91) may be accomplished via the tool-free fastener 104. For instance, once a desired rotational position is obtained, the tool-free fastener 104 may be inserted through one of the arcuate grooves 112 or 114 and secured into a threaded hole on the end cap 80. The tool-free fastener 104 may then be tightened via the handle 106 to retain the desired rotational position. As can be appreciated, the amount of adjustment in the rotational direction 91 is defined by the angular range provided by the arcuate grooves 112 and 114. By way of example only, each of the arcuate grooves may provide an angular range of rotational movement over a span of at least approximately 90, 180, 270, or 360 degrees, or an angular range between 0 and 360 degrees.

As will be appreciated, it may be ideal for the air manifold 14 to retain an expected cross-sectional shape, such as cylindrical/circular shape, as shown the embodiment of FIGS. 2-4. However, certain stresses introduced during the manufacturing process may sometimes cause the main body 74 to slightly distort from its expected shape. For instance, in some manufacturing processes, the act of joining nozzles to the main body of an air manifold using a welding process (e.g., metal inert gas (MIG) or tungsten insert gas (TIG) welding processes) may cause the main body to distort due to heat. This type of distortion is sometimes referred to as "egging," as the cross-sectional shape of the main body may sometimes distort or become eccentric to resemble the shape of an egg.

Because it may be difficult to predict the precise dimensions of the resulting distorted shape of the main body 74, which may sometimes be unique to each manufactured unit, it may be difficult to mass-produce an inlet-side mounting plate 96 having an opening suitable for receiving the inlet 48 of the air manifold 14. As discussed further below, this problem may be alleviated using the insert 98, which may be a plastic or polymer material that may be inserted into an opening on the inlet-side mounting plate 96. In one embodiment, the insert 98 may include a slit or separation 116 that allows for the insert 98 to be fitted to the mounting plate 96 (e.g., via an interference fit). The insert 98 may be configured to provide some degree radial clearance and, thus, when assembled, the inlet 48 of the air manifold may be inserted through the insert opening 118, with the provided radial clearance compensating for any distortions (e.g., egging) that the main body 74 may exhibit as a result of manufacturing stresses (e.g., welding of the nozzles 52). Embodiments of the inlet-side mounting plate and insert will be discussed in more detail below in FIGS. 5-10.

As further shown in FIGS. 2-4, the mounting plates 96 and 100 each include openings 122, which may be used to couple the mounting plates 96 and 100 to a component of the system 10 (FIG. 1). Thus, in practice, the adjustable mounting system of the air manifold 14 may be utilized such that the mounting plates 96 and 100 are fixedly coupled or anchored to the system 10, and such that the mounting plates 96 and 100 may be coupled to a component of the system 10, such as a stationary mounting arm, a robotic arm, or the like. Axial retention of the air manifold 14 is provided on the inlet end by the insert 98 (e.g., via an interference fit against the outer wall 95), and on the adjustment end via the tool-free fastener 104 and separator element 108. Prior to securing (e.g., tightening a threaded connection of) the tool-free fastener 104, the air manifold 14 may be pivoted about the rotational axis 78 until a desired orientation is obtained, at which point the tool-free fastener 104 may be secured to retain the desired rotational position. These features are discussed in more detail below in FIGS. 11-13.

FIG. 5 shows a perspective view of the inlet-side mounting plate 96 in a fitted arrangement with the insert 98, but with both being removed from outer wall 95 of the inlet 48 of the main body 74. FIGS. 6 and 7 provide additional views of the inlet-side mounting plate 96 with the insert 98 removed therefrom, and FIGS. 8-10 provide additional views of the insert 98 removed from the mounting plate 96. As discussed above, the insert 98 may be made from a material that includes a plastic or polymer, such as an ultra-high-molecular-weight (UHMW) polyethylene material, a polyurethane material, a polypropylene material, an injection polyamide material, some other type of thermoplastic material, or some combination thereof. As such materials allow for some degree of flexibility and pliability, the separation or slit 116 enables the insert 98 to be fitted to an opening 128 (FIG. 6) of the mounting plate 96 via a groove 126 (shown in more detail in FIGS. 9-10) formed in an outer wall 140 (FIG. 8) of the insert 98. For instance, the fitting of the groove 126 of the insert 98 to the opening 128 of the mounting plate 96 may be an interference fit. Additionally, the insert 98 includes an inner wall 124 that may be configured to receive the inlet 48 of air manifold 14. For instance, the outer wall 95 of the inlet 48 may be fitted through the opening 118 of the insert 98 and secured via an interference fit. As discussed above, the insert 98 provides some degree of radial clearance that may enable the inlet 48 to be securely fitted thereto despite the presence of minor distortions in the main body cross-sectional shape that may have resulted from manufacturing stresses.

A front view of an embodiment of the inlet-side mounting plate 96 is shown in FIG. 6 with the insert 98 removed. As illustrated, the mounting plate 96 includes an opening 128. The opening 128 may have a diameter 130 and may be configured to receive the insert 98 via the groove 126, as mentioned above in FIG. 5. The diameter 130 is greater than the diameter 84 (FIG. 2) of the inlet 48 and, depending on the inlet diameter 84, may be between approximately 1.15 to 7.5 inches or more in some embodiments. In other embodiments, the diameter 130 may be determined as a percentage of the inlet diameter 84. For instance, in one embodiment, the diameter 130 may be between approximately 10 to 30% greater than the inlet diameter 84 or, more specifically, between approximately 15 to 25% greater than the inlet diameter 84. By way of example only, assuming an inlet diameter 84 of approximately 3 inches, the diameter 130 may be between approximately 3.3 to 3.9 inches in one embodiment. Further, in one embodiment, regardless of the inlet diameter 84, the diameter 130 may be sized accordingly to support an interference fit between the opening 128 and the groove 126 of the insert 98 (e.g., with the insert opening 118 being suitably configured to receive the inlet 84).

The inlet-side mounting plate 96 also has a height 132 and a width 134. In some embodiments, the height 132 of the mounting plate 98 may be between approximately 3 to 12 inches or more. In one embodiment, the height 132 may also be determined as a percentage of the inlet diameter 84. For instance, in one embodiment, the height 132 may be between approximately 35 to 75% greater than the inlet diameter 84 or, more specifically, between approximately 40 to 65% greater than the inlet diameter 84. Thus, assuming again an inlet diameter 84 of approximately 3 inches, the height 132 may be between approximately 4.05 to 5.25 inches in one embodiment. Further, the width 134 of the mounting plate 96 may, in certain embodiments, be between approximately 2 to 9 inches or more. In one embodiment, the width 134 may also be determined as a percentage of the inlet diameter 84. For instance, in one embodiment, the width 132 may be between approximately 30 to 50% greater than the inlet diameter 84 or, more specifically, between approximately 33 to 40% greater than the inlet diameter 84. Thus, assuming again an inlet diameter 84 of approximately 3 inches, the width 134 of the mounting plate may be between approximately 3.9 to 4.5 inches in one embodiment. The inlet-side mounting plate 96 also has a thickness, shown in FIG. 7 as reference number 136. In certain embodiments, the thickness of the mounting plate 136 may be between approximately 0.1 to 0.25 inches or, more specifically, between approximately 0.1 to 0.15 inches. In certain embodiments, the inlet side mounting plate 96 (as well as the adjustment-side mounting plate 98 discussed further below) may be formed of a material such as stainless steel, aluminum, titanium, or some combination thereof.

FIGS. 8-10 depict more detailed views of the insert 98 removed from the mounting plate 96. For instance, referring to the front-view of the insert 98 shown in FIG. 8, the separation/slit 116 can be clearly seen. From a manufacturing standpoint, the insert 98 may first be formed without the separation 116, and subsequent to the formation of the insert 98, the separation 116 may be formed by cutting through the insert 98 with any suitable cutting tool (e.g., a knife). In the depicted embodiment, the separation 116 is formed such that it is angled with respect to the diameter 144 of the insert 98. In other embodiments, the separation 116 may be cut to be parallel to the diameter 144. Further, FIG. 8 also depicts the groove 126 formed in the outer wall 140 of the insert 98, as mentioned above in FIG. 5, which is represented herein by the dashed line 142. The line 142 may, for example, represent the base of the groove 126.

FIG. 9 shows a cross-sectional view of the insert 98 taken through the cut-line 9-9 of FIG. 8. As shown, the insert 98 includes an inside diameter (ID) 144 and an outside diameter (OD) 146. The diameter between the base 142 of the groove 126 on opposite ends of the insert 98 is also represented here by reference number 148 (e.g., a groove diameter). As discussed above, the insert 98 has an opening 124 that is configured to receive the inlet 48 of the air manifold 14, and may provide some degree of radial clearance in order to compensate for distortions in the shape of the air manifold 14 (and its inlet 48) that may have resulted from manufacturing stresses (e.g., egging). For example, in one embodiment, the ID 144 of the insert 98 may provide a radial clearance of between approximately 0.01 to 0.1 inches or, more specifically, between approximately 0.01 to 0.05 inches. In a further embodiment, the ID 144 of the insert 98 may be between approximately 0.3 to 3% greater than the inlet diameter 84. For instance, referring again to the above example of an inlet diameter 84 of approximately 3 inches, the ID 144 of the insert 98 may be between approximately 3.01 to 3.09 inches in one embodiment. As can be appreciated, this radial clearance may permit the inlet 48 of the air manifold 14 to fit through the opening 118 of the insert 98, despite distortions in shape that may have resulted from manufacturing stresses, while still permitting an interference fit that removably secures the inside surface 124 of the insert 98 to the outer wall 95 of the inlet 48.

The OD 146 of the insert 98 may, in some embodiments, be between approximately 25 to 40% or, more specifically, between approximately 30 to 35% of the ID 144. For example, referring again to the above example and assuming the ID 144 has a diameter of between approximately 3.01 to 3.09 inches, the OD 144 may be between approximately 3.75 to 4.2 inches in one embodiment. As can be appreciated, the groove diameter 148 may be selected such that the insert 98 may be securely fitted to the opening 128 of the mounting plate 96 via the groove 126 (e.g., via interference fit). For instance, in one embodiment, the groove diameter 148 may be selected to be approximately equal to the diameter 130 of the opening 128.

Referring to FIG. 10, which shows a more detailed view of the region of the insert 98 enclosed by arcuate line 10-10 of FIG. 9, the groove 126 formed in the outer wall 140 of the insert 98 may have a width 152 that is approximately equal to or slightly less than the thickness 136 of the mounting plate 96. For instance, as discussed above, the insert 98 may be formed of a plastic (e.g., thermoplastic) or polymer material that permits some degree of pliability and flexibility. Thus, even if the width 152 of the groove 126 is slightly less than the thickness 136 of the mounting plate 126, such as approximately 0.1 to 0.3 percent less, the properties of the material forming the insert 98 may nonetheless allow it to be fitted to the mounting plate 96 via an interference fit. For example, in one embodiment, assuming the thickness of the mounting plate 96 is approximately 0.11 inches, the width 152 of the groove 126 may be approximately equal to 0.11 inches, or may be slightly less, such as between approximately 0.102 to 0.105 inches. The insert 98 also has a thickness 154 which, in certain embodiments, may be between approximately 0.25 to 0.5 inches or, more specifically, between 0.3 to 0.4 inches. Further, in the illustrated embodiment, the outer wall 140 of the insert 98 may include chamfered edges 158.

As further shown in FIG. 10, the inner surface 124 of the insert 98 in the illustrated embodiment may include both flat portions 163 and an angled indention 162. In the illustrated embodiment, the flat portions 163 may each have a width 160 that is between approximately 20 to 30% of the total thickness 154 of the insert 98 and may extend inwards from opposing lateral surfaces 165 of the insert 98 to form a portion of the inner surface 124. In the illustrated embodiment, the angled indention 162 may be generally centered between the flat portions 163 of the inner surface 124. As can be appreciated, the angled indention 162 reduces the area of contact between the inner surface 124 of the insert 98 and the outer wall 95 of the inlet 48 and may, therefore, improve rotational movement (e.g. in conjunction with the adjustment end of the air manifold 14) for adjusting the rotational position of the air manifold 14, while still sufficiently maintaining an interference fit when a desired rotational position is achieved and rotational adjustment stops. The angled indention 162 may have an angle 164 that is between approximately 90 to 160 degrees or, more specifically between approximately 120 to 150 degrees in some embodiments.

Figure 11:
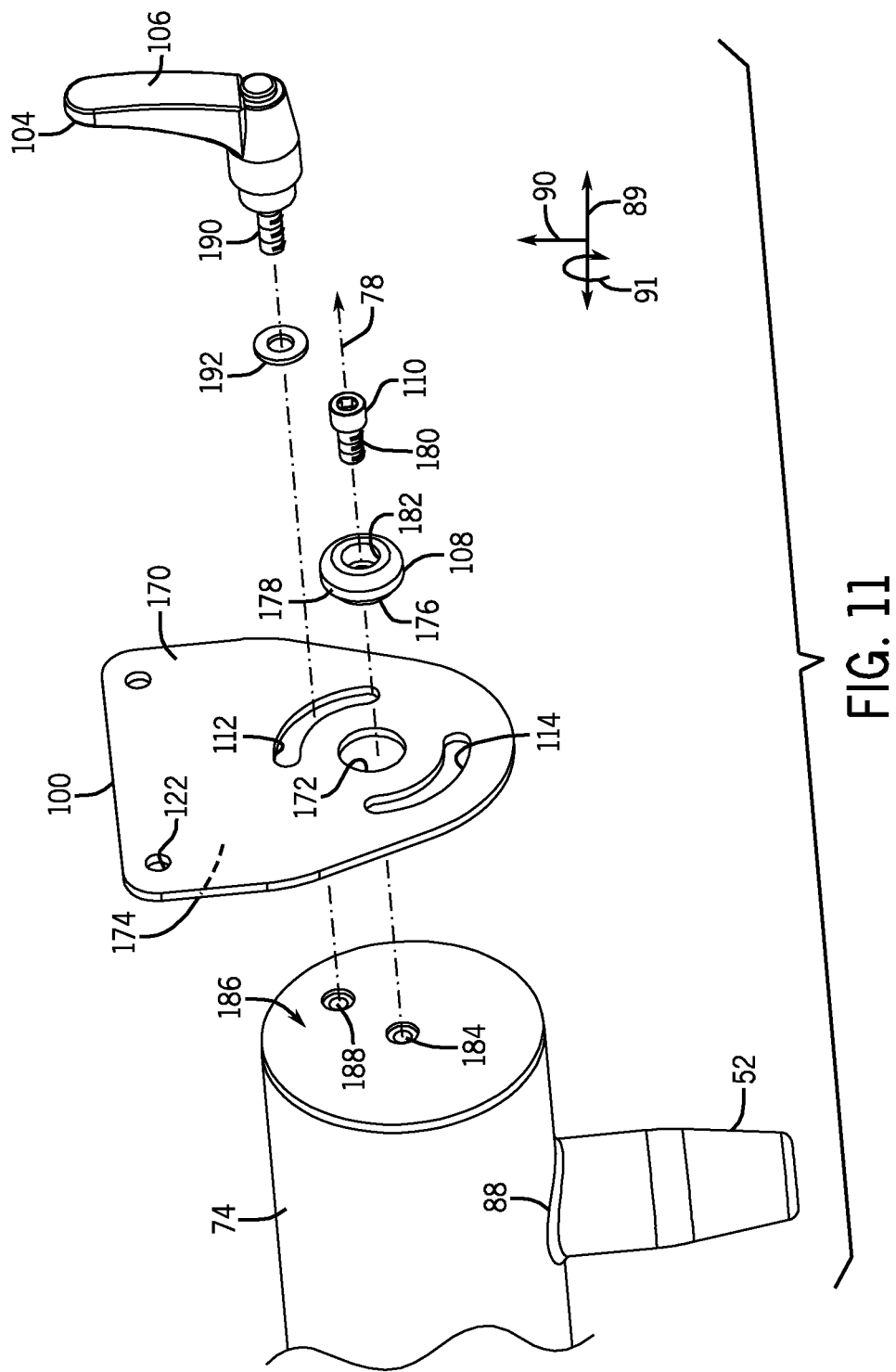
FIG. 11 is an exploded perspective view of an adjustment side of the embodiment of the air manifold shown in FIGS. 2-4

As mentioned above, the assembly of the adjustment-side mounting plate 100 to the end cap 80 may be facilitated by the fasteners 104 and 110. For instance, as shown in FIG. 11, the mounting plate 100 includes an outer face 170 and an inner face 174 (with the reference lead line shown partially in phantom). The separator element 108, which may include an axial spacer or standoff, and the fastener 110 may provide for axial retention of the air manifold 14 (e.g., in the axial direction 89), while still allowing for the rotational position of the air manifold 14 to be pivoted about the longitudinal axis 78. For instance, the separator 108 may include an inner cylindrical portion 176 that has a smaller diameter compared to an outer cylindrical portion 178. The inner cylindrical portion 176 may be fitted into the circular opening 172 on the mounting plate 100, leaving the outer cylindrical portion 178 to extend from the outer face 170. The fastener 110 includes a threaded portion 180, which may be inserted through an opening 182 of the separator 108 and the opening 172 of the mounting plate 100 and threaded into a hole 184 on the end cap 80, thereby securing the inner face 174 of the mounting plate 100 to the outer face 186 of the end cap 80 and providing for axial retention of the air manifold 14.

As shown in the present embodiment, the hole 184, opening 172, separator 108, and fastener 110 are all generally aligned with the longitudinal axis 78 of the air manifold 14. While the fastener 110 and separator 108 provide axial retention (e.g., via a friction fit), the rotational position of the air manifold 14 may still be adjustable prior to tightening the tool-free fastener 104 within the hole 188, i.e., via pivoting the air manifold 14 about the longitudinal axis 78. As discussed above, the tool-free fastener 104 includes a handle or lever 106 that enables a user to turn the fastener 104 clockwise or counter-clockwise without a separate tool. The assembly of the tool-free fastener 104 to the hole 188 may include inserting a threaded portion 190 of the fastener 104 through a washer 192 and through one of the arcuate grooves 112 or 114. As discussed above, the arcuate grooves 112 and 114 may provide for an angular range of rotational movement with respect to the rotational axis 78, at which the fastener 110 acts as the pivot point. Thus, the relative location of the hole 188 for receiving the threaded portion 190 of the tool-free fastener 104 may vary within grooves 112 or 114 depending on the rotational position (e.g., in rotational direction 91) of the air manifold 14.

To retain a particular rotational position, the tool-free fastener 104 may be tightened (e.g., via clockwise rotation) within the threaded hole 188. The foregoing technique provides for relatively easy adjustment of the rotational position of the air manifold 14 to adjust the direction of the exiting air flow 58 (FIG. 1) by: loosening (e.g., via counter-clockwise rotation) the tool-free fastener 104, repositioning the air manifold 14 (or air knife or other type of fluid discharge device), and then re-tightening the tool-free fastener 104 once a new desired rotational position is obtained. As will be appreciated, the rotational adjustment of the air manifold 14 may be performed without completely removing the tool-free fastener 104 from the hole 188. That is, the tool-free fastener 104 need only be loosened to allow for movement within the grooves 112 or 114 (although complete removal of the fastener 104 may be necessary if a user wishes to reposition the location of the hole 188 from the groove 112 to the groove 114 or vice versa).

Figure 12:
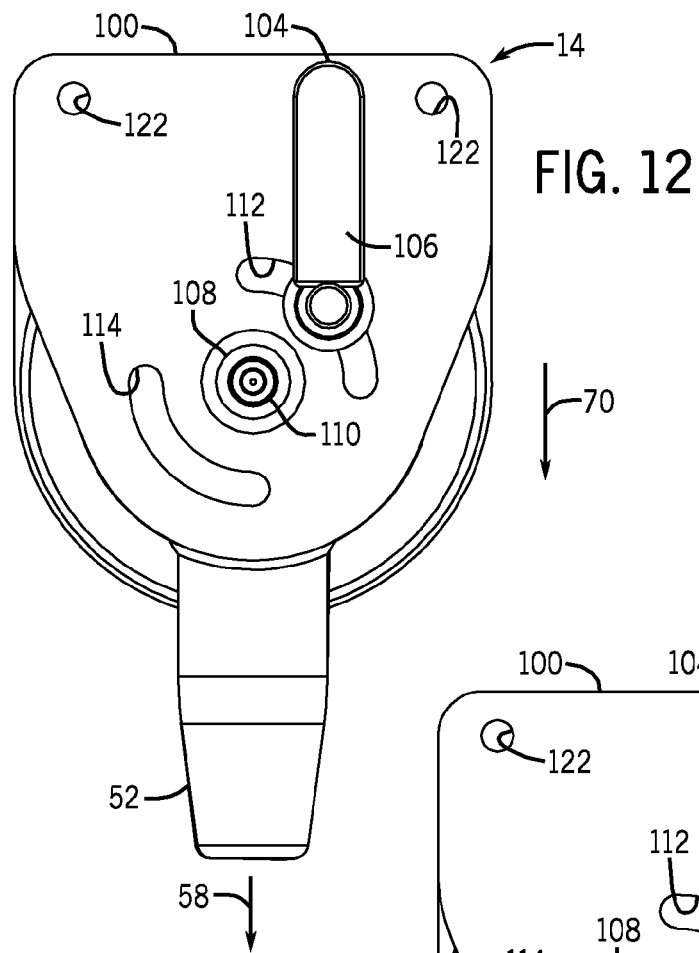
FIG. 12 is a front view of the embodiment of the air manifold shown in FIGS. 2-4 with the adjustment end facing forward, wherein the air manifold is retained in a first rotational position by a tool-free fastener.
Figure 13:
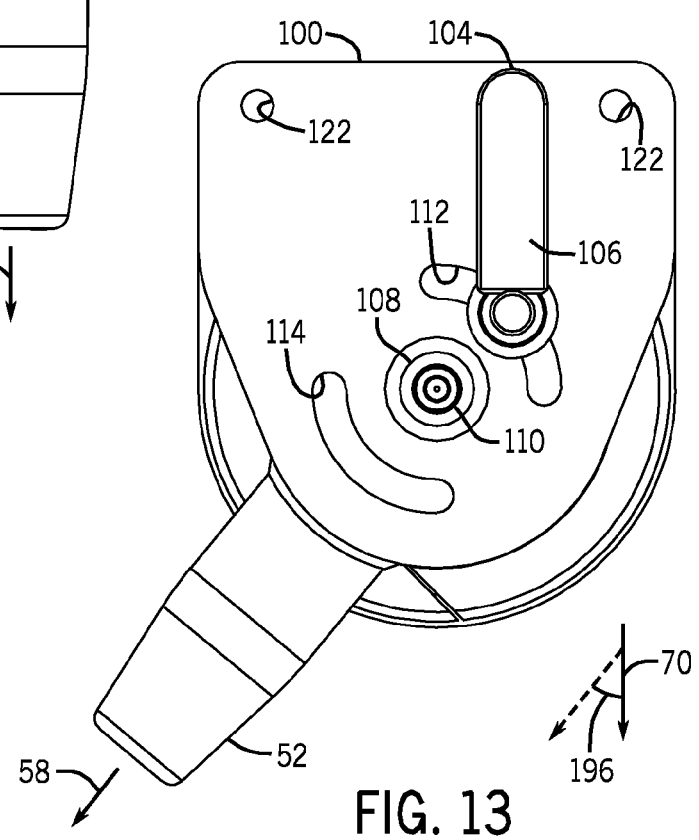
FIG. 13 is a front view of the air manifold, as shown in FIG. 12, wherein the air manifold is repositioned to and retained at a second rotational position by the tool-free fastener.

FIGS. 12 and 13 depict front views of the adjustment side of the air manifold 14, and further illustrate how the rotational position of the air manifold 14 may be adjusted. For instance, FIG. 12 illustrates a front view of the air manifold 14 with the adjustment end facing forward and with the air manifold 14 being retained in a first rotational position, such that the air flow 58 exiting the nozzle 52 is directed downwards in the vertical direction 70.

Next, FIG. 13 shows a front view of the air manifold 14 with the adjustment end facing forward, wherein the air manifold 14 is repositioned to a second rotational position. As discussed above, the rotation of the air manifold 14 may be about the rotational axis 78, whereby the fastener 110 acts as a pivot point for rotational movement. In the illustrated second rotational position of FIG. 13, the air manifold 14 is rotated clockwise to an angle 196 with respect to the vertical direction 70, such that the air flow 58 exits the nozzle 52 at the angle 196. As discussed above, adjusting the rotational position of the air manifold 14 from the first rotational position of FIG. 12 to the second rotational position of FIG. 13 may include loosening the tool-free fastener 104, repositioning the air manifold 14 to the second rotational position, and then re-tightening the tool-free fastener 104 after obtaining the second rotational position. In this manner, the mounting system, which includes the inlet-side mounting plate 96, the insert 98, the adjustment-side mounting plate 100, and the tool-free fastener 104, may provide a technique for adjusting the position of an air manifold that may be accomplished with relative ease and without requiring separate tools.

Additionally, the insert 98 provides radial clearance that may enable the inlet side of the air manifold 14 to be securely mounted to the inlet-side mounting plate 96, even if stresses during the manufacturing process caused some degree of distortion in the shape (e.g., cross-sectional shape) of the air manifold 14. Further, while the present techniques have been discussed by way of example with regard to a generally cylindrical air manifold 14, it should be noted that present techniques may also be applied to air manifolds having different cross-sectional shaped bodies, such as square, diamond, rectangular, oval, etc. In such embodiments, the insert 98 and mounting plate 96 may be configured as discussed herein to accept the shape of the inlet while providing some clearance to account for distortions and/or slight deviations from an expected shape that may have occurred due to manufacturing stresses. Additionally, while discussed herein in the context of an air manifold 14, it should be understood that the present techniques are also applicable to other types of fluid discharge devices, such as air knives.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a fluid discharge device comprising a main body having a first and a second end, wherein the first end comprises an inlet having a first diameter, and wherein the second end is sealed; and
   a mounting system comprising:
      a first mounting plate comprising a first opening having a second diameter greater than the first diameter; and
      an insert having an outside diameter defined by an outer wall configured to be fitted to the first opening of the first mounting plate and an inside diameter defined by an inner wall defining a second opening, wherein the insert is configured to receive the inlet through the second opening, wherein the second opening provides a radial clearance for the inlet relative to the first diameter when the inlet is disposed within the insert, and
   wherein the radial clearance is configured to accommodate variations in the first diameter of the inlet.

2. The system of claim 1, wherein the insert comprises a separation that enables the insert to be fitted to the first opening of the first mounting plate.

3. The system of claim 1, wherein the outer wall of the insert comprises a groove that extends radially inwards from the outer wall, wherein the groove comprises a base and width defined by first and second opposing sidewalls, wherein the groove is configured to be removably fitted to the first opening of the first mounting plate via an interference fit.

4. The system of claim 3, wherein the width of the groove is approximately equal to a thickness of the first mounting plate or is approximately 0.1 to 0.3 percent less than the thickness of the first mounting plate.

5. The system of claim 1, wherein the insert is made from a material that includes at least one of ultra-high-molecular-weight (UHMW) polyethelene, polyurethane, polypropylene, an injection polyamide material, a thermoplastic, or some combination thereof.

6. The system of claim 1, wherein the radial clearance is between approximately 0.01 to 0.05 inches.

7. The system of claim 1, wherein the outside diameter of the insert is between approximately 25 to 40 percent greater than the inside diameter of the insert.

8. The system of claim 1, wherein the inside diameter of the insert is between approximately 0.3 to 3 percent greater than the first diameter.

9. The system of claim 1, wherein the radial clearance provided by the insert allows for the inlet of the fluid discharge device to be received through the second opening even if the main body of the fluid discharge device exhibits a degree of shape distortion due at least partially to manufacturing stresses.

10. The system of claim 9, wherein an outer wall of the inlet is removably fitted to the inner wall of the insert via an interference fit.

11. The system of claim 1, wherein the inner wall of the insert comprises a first portion having an angled indention having an angle of between approximately 90 to 160 degrees.

12. The system of claim 1, wherein the second diameter of the first mounting plate is approximately 10 to 30 percent greater than the first diameter of the inlet.

13. The system of claim 1, wherein the second end of the main body of the fluid discharge device is sealed by an end cap coupled to the second end of the main body.

14. The system of claim 1, wherein the mounting system comprises:
  a second mounting plate having a third opening and at least one arcuate groove radially offset from the third opening and extending circumferentially about the third opening;
  a first fastener configured to fit through the third opening and to be threaded within a first hole on an end cap of the fluid discharge device, wherein the first fastener provides axial retention of the second mounting plate to the second end when threaded within the first hole, wherein the third opening and the first hole are generally aligned with a longitudinal rotational axis of the fluid discharge device; and
  a second fastener configured to fit through the at least one arcuate groove and to be threaded within a second hole on the end cap of the fluid discharge device, wherein the second hole is radially offset from the first hole, wherein the second fastener provides rotational retention of the second mounting plate to the second end when threaded within the second hole, and wherein the second fastener is releasable to allow the fluid discharge device to pivot about the longitudinal rotational axis.

15. The system of claim 1, wherein the fluid discharge device comprises at least one of an air manifold or an air knife.

16. A system comprising:
  a fluid discharge device comprising a main body having a first and a second end, wherein the first end comprises an inlet having a first diameter, and wherein the second end is sealed; and
  a mounting system comprising:
    a first mounting plate comprising a first opening having a second diameter greater than the first diameter; and
    an insert having an outside diameter defined by an outer wall configured to be fitted to the first opening of the first mounting plate and an inside diameter defined by an inner wall defining a second opening, wherein the insert is configured to receive the inlet through the second opening, wherein the inner wall comprises:
      a first portion having an angled indention configured to increase a radial clearance for the inlet relative to the first diameter when the inlet is disposed within the insert, wherein the radial clearance is configured to accommodate variations in the first diameter of the inlet, and the angled indention comprises an angle of between approximately 90 to 160 degrees; and
      a second portion configured to removably fit to an outer wall of the inlet via an interference fit, wherein the second portion comprises sections extending inward from opposing lateral surfaces of the insert to the first portion, and the angle of the angled indention is centered between the sections.

17. The system of claim 16, wherein the first portion comprises approximately 40 to 60 percent of a width of the insert.

18. The system of claim 16, wherein the second portion comprises flat portions between the first portion and opposing lateral surfaces of the insert, and the first portion is substantially centered between the flat portions.

19. The system of claim 16, wherein the insert comprises a separation that enables the insert to be fitted to the first opening of the first mounting plate.

20. The system of claim 16, wherein the radial clearance is between approximately 0.01 to 0.05 inches.

* * * * *